United States Patent
Kemkemian

(10) Patent No.: US 7,750,839 B2
(45) Date of Patent: Jul. 6, 2010

(54) METHOD FOR DETECTING ATMOSPHERIC TURBULENCE BY AN EMBEDDED ELECTROMAGNETIC SENSOR, NOTABLY ON BOARD AN AIRCRAFT

(75) Inventor: Stéphane Kemkemian, Paris (FR)

(73) Assignee: Thales (FR)

( * ) Notice: Subject to any disclaimer, the term of this patent is extended or adjusted under 35 U.S.C. 154(b) by 195 days.

(21) Appl. No.: 12/109,839

(22) Filed: Apr. 25, 2008

(65) Prior Publication Data

US 2008/0291082 A1 Nov. 27, 2008

(30) Foreign Application Priority Data

Apr. 27, 2007 (FR) .................................. 07 03097

(51) Int. Cl.
*G01S 13/00* (2006.01)
(52) U.S. Cl. .................................... 342/26 B; 342/26 R
(58) Field of Classification Search .............. 342/26 R, 342/26 A, 26 B, 26 C, 26 D
See application file for complete search history.

(56) References Cited

U.S. PATENT DOCUMENTS

| | | | | | |
|---|---|---|---|---|---|
| 4,649,388 | A | * | 3/1987 | Atlas | ......................... 342/26 D |
| 4,965,573 | A | * | 10/1990 | Gallagher et al. | ........... 340/968 |
| 5,077,558 | A | * | 12/1991 | Kuntman | .................. 342/26 B |
| 5,175,551 | A | * | 12/1992 | Rubin | ....................... 342/26 D |
| 5,311,183 | A | * | 5/1994 | Mathews et al. | ........... 342/26 B |
| 5,351,045 | A | * | 9/1994 | Cornman | ..................... 340/968 |
| 5,359,330 | A | * | 10/1994 | Rubin et al. | ............... 342/26 D |
| 5,523,759 | A | * | 6/1996 | Gillberg et al. | ........... 342/26 B |
| 5,539,409 | A | * | 7/1996 | Mathews et al. | ........... 342/26 B |
| 5,648,782 | A | * | 7/1997 | Albo et al. | ................. 342/26 D |
| 5,973,635 | A | * | 10/1999 | Albo | ........................ 342/26 D |
| 6,184,816 | B1 | * | 2/2001 | Zheng et al. | .............. 342/26 R |
| 6,456,226 | B1 | * | 9/2002 | Zheng et al. | .............. 342/26 R |
| 6,456,227 | B2 | * | 9/2002 | Wada et al. | ................ 342/26 R |
| 6,480,142 | B1 | * | 11/2002 | Rubin | ....................... 342/26 R |
| 6,563,452 | B1 | * | 5/2003 | Zheng et al. | .............. 342/26 R |
| 6,615,140 | B2 | * | 9/2003 | White et al. | .................... 702/3 |

OTHER PUBLICATIONS

Inanov et al: "Radar Invenstigations of the Divergence of the Wind Field in Convective Clouds"; Izvestiya, Atmospheric and Oceanic Physics; vol. 19, No. 6, 1983, pp. 430-463; XP008087951.

* cited by examiner

*Primary Examiner*—Thomas H Tarcza
*Assistant Examiner*—Peter M Bythrow
(74) *Attorney, Agent, or Firm*—Lowe Hauptman Ham & Berner, LLP

(57) ABSTRACT

An aim of the invention is to allow the detection of turbulence in the absence of tracers. A radar is embedded aboard an aircraft (21) and implements the following steps: searching for the upper part of a convective system (1) situated outside the given zone, reflecting the electromagnetic waves; searching for divergence zone (7) inside the convective system by searching for a divergence profile; reckoning the appearance of turbulence in the given zone as a function of observable meteorological phenomena in the divergence zone (7) by applying fluid mechanics properties.

17 Claims, 5 Drawing Sheets

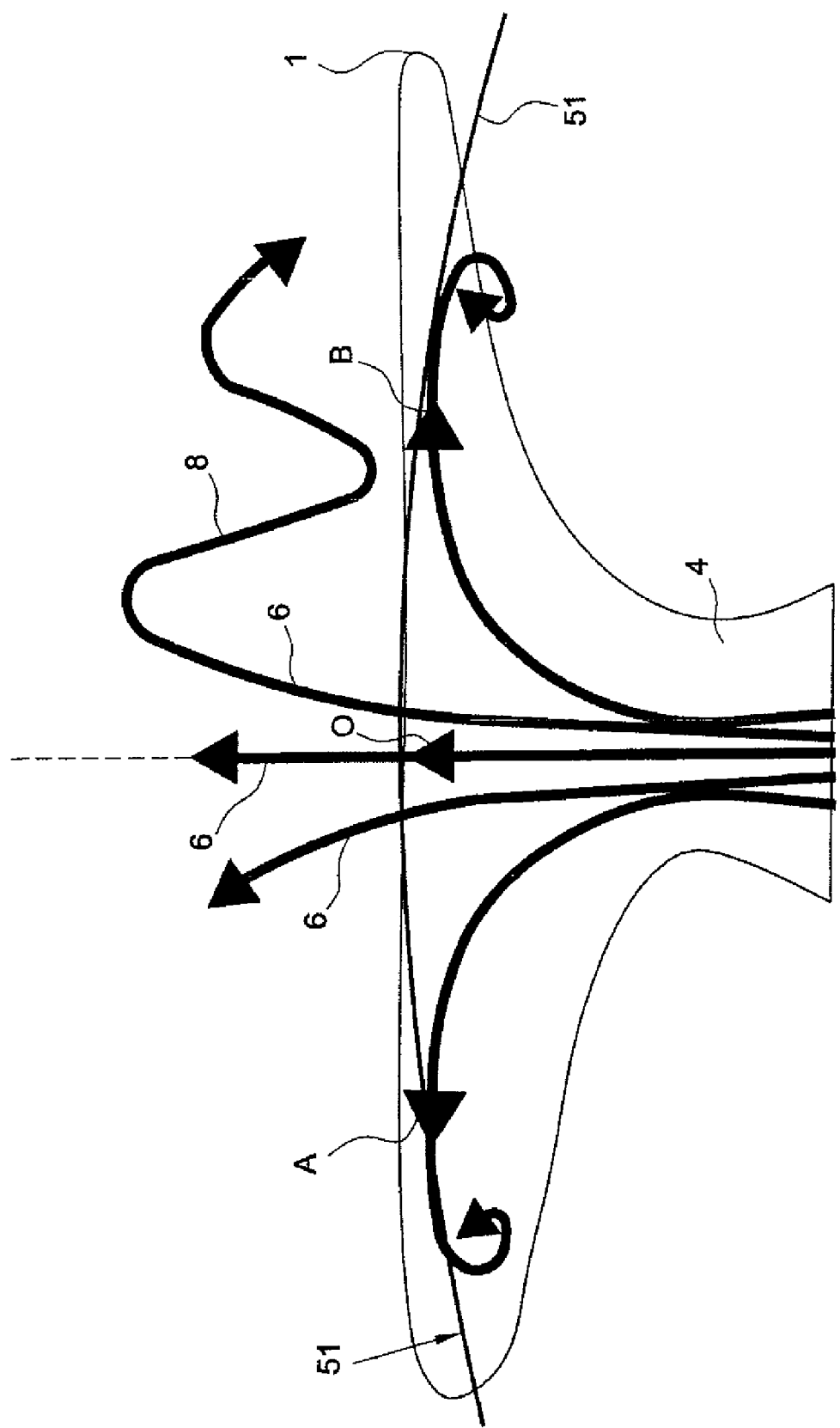

METHOD FOR DETECTING ATMOSPHERIC TURBULENCE BY AN EMBEDDED ELECTROMAGNETIC SENSOR, NOTABLY ON BOARD AN AIRCRAFT

RELATED APPLICATIONS

The present application is based on, and claims priority from, French Application Number 07 03097, filed Apr. 27, 2007, the disclosure of which is hereby incorporated by reference herein in its entirety.

FIELD OF THE INVENTION

The present invention relates to a method for detecting atmospheric turbulence by an embedded electromagnetic sensor, notably on board an aircraft.

BACKGROUND OF THE INVENTION

Aerial navigation seeks to avoid turbulent atmospheric zones. To detect them and anticipate them, aircraft generally employ a meteorological radar operating with centimetric waves.

The principle of radar detection of dangerous zones relies notably on the analysis of the radar echoes of tracers which are generally hydrometeors such as for example drops of water, snow, hail or supercooled ice. In proximity to the ground, it is also possible to utilize the reflection of the radar waves on non-aqueous meteors such as dust and insects for example, these elements being entrained by the movements of the air mass. However, at high altitude, only hydrometeors can be utilized.

When turbulence zones that might lie on the route of the aircraft contain such tracers, the customary procedures rely:
  either on the measurement of a very significant radar reflectivity, greater than about 45 dBz, which characterizes the presence of strong precipitations;
  or on the measurement of a significant Doppler spreading of the radar echoes which conveys the presence of significant haphazard motions of the meteors entrained by the surrounding mass.

There exist, however, particular flight configurations where significant turbulence arises at spots devoid of any tracer that might produce radar echoes. Such "clear sky" turbulences are known by the acronym CATs standing for the expression "Clear Air Turbulences". One of these particular situations may be encountered when overflying stormy convective systems such as cumulo-nimbus notably. In this case, the customary procedures do not allow the detection of turbulence. A known solution could use radar systems of decimetric to decametric wavelengths which utilize notably the Bragg diffraction due to the slight variations in the refractive index of the atmosphere when the latter is the seat of turbulent phenomena. These systems are, however, hardly compatible with installation on an aircraft on account notably:
  of the size of the aerials required, in particular because of the large wavelengths involved;
  of the transmission power required to obtain sufficient range, therefore advance notice, having regard to the weakness of the reflectivity resulting from the Bragg diffraction phenomenon.

SUMMARY OF THE INVENTION

An aim of the invention is notably to allow the detection of turbulence in the absence of tracers. For this purpose, the subject of the invention is a method for detecting atmospheric turbulence in a given zone by an electromagnetic sensor, the method comprising:
  a step of searching for the upper part of a convective system that may notably be situated outside the given zone, reflecting the electromagnetic waves;
  a step of searching for a speed divergence zone inside the convective system by searching for a divergence profile;
  a step of reckoning the appearance of turbulence in the given zone as a function of observable meteorological phenomena in the divergence zone by applying fluid mechanics properties.

The sensor performs for example a detection with negative elevation of close to 0°.

The profile of the divergence can be given by the quantity $$\frac{\partial V_R}{\partial R}$$

where $V_R$ represents the radial speed and R the radial distance with respect to the sensor of an element of the divergence zone, the quantity $$\frac{\partial V_R}{\partial R}$$

being negative on a given radial distance portion indicating the possible existence of a divergence zone.

The divergence zone is for example detected when the absolute value of the quantity $$\frac{\partial V_R}{\partial R}$$

is greater than a given threshold.

In a possible mode of implementation, turbulence is reckoned to be detected when the absolute value of the quantity $$\frac{\partial V_R}{\partial R}$$

exceeds a given threshold St.

Turbulence can also be detected when the quantity $$\left|\frac{V_R(A) - V_R(B)}{2}\right|$$

is greater than a given threshold, $V_R(A)$ and $V_R(B)$ being the radial speeds at points A and B situated at two substantially opposite ends of the divergence zone. Advantageously, an isolated element of the divergence zone having an oscillation motion obeying a damped sinusoidal angular frequency known a priori, the reckoning of appearance of the turbulence utilizes the properties of these oscillations, the oscillating properties being utilized to extrapolate what is measured at a spot visible to the radar to the given zone, that may be non-reflecting to the radar.

Advantageously, the sensor can be embedded aboard an aircraft.

The sensor measures for example the rotational motion of the divergence so as to compensate for the measurement errors induced by this motion in the determination of the profile.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWING

Other characteristics and advantages of the invention will become apparent with the aid of the description which follows offered in relation to appended drawings which represent:

FIG. 5, an illustration of an updraft zone inside the convective system;

DETAILED DESCRIPTION OF THE DRAWING

Figure 1:
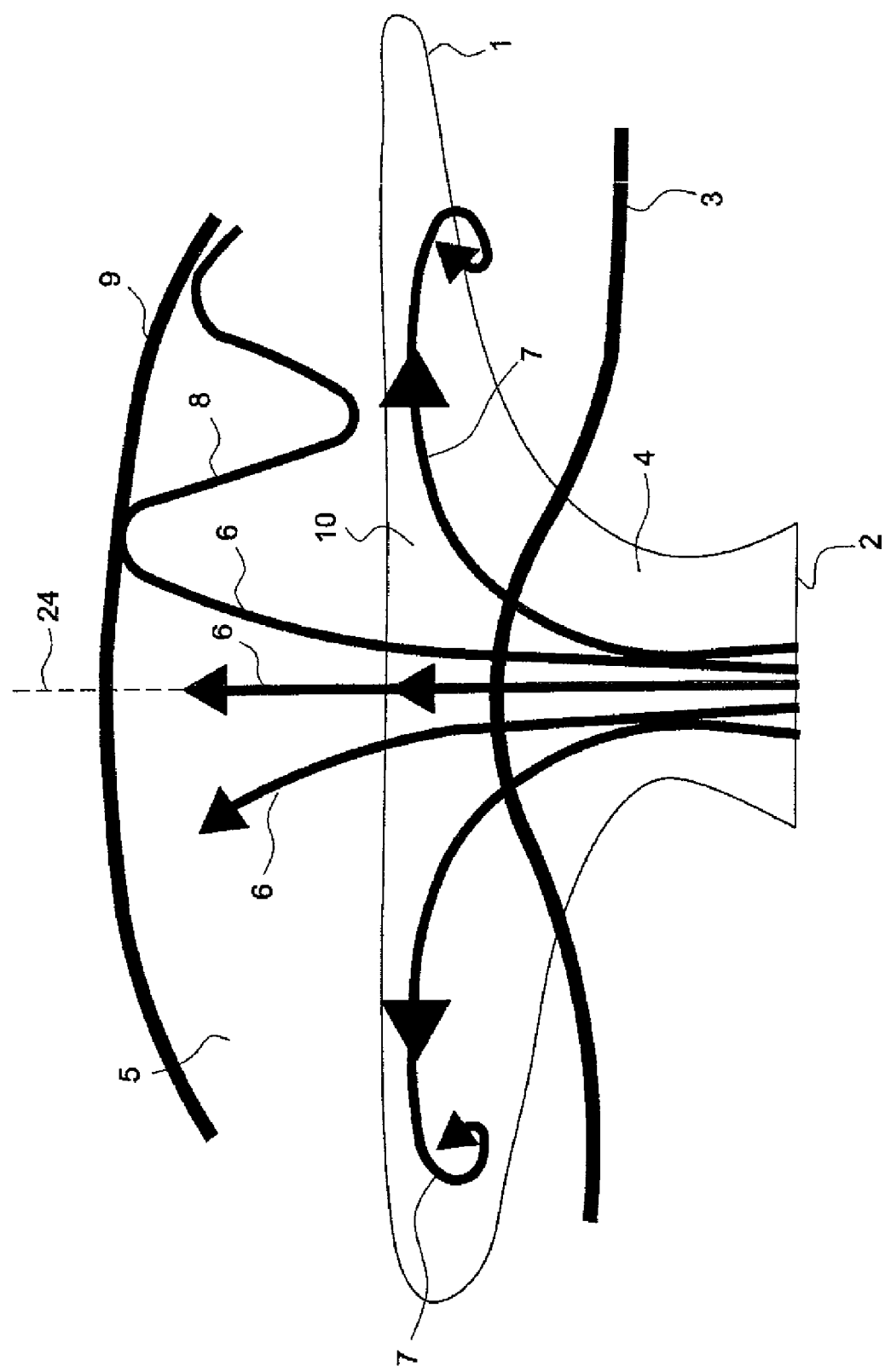
FIG. 1, an illustration of the updraft mechanism of a convective system.

FIG. 1 illustrates notably the updraft rebound mechanism above a convective system 1 such as a cloud. Hot and humid air is sucked in at the base 2 of the cloud. If the thermodynamic profile of the atmosphere is unstable in relation to this sucked-in air an updraft phenomenon is initialized. As this sucked-in air ascends and cools, the large amount of condensed water induces a precipitation. When all the water is condensed or frozen, or the updraft reaches a zone where the negative temperature gradient with altitude is less marked, a stratification phenomenon 10 appears, giving an anvil shape, having a base 3, with cloud of cumulo-nimbus type for example. In the unstable zone, in the core of the tower 4 of the cumulo-nimbus for example, the upward speed of the air stream may be very significant and reach a few tens of metes per second. When this moving air penetrates into the stability zone 5 situated above the cloud 1:
- the central part of the cloud possesses sufficient kinetic energy to continue to rise vertically 6 in the stable zone 5 up to a certain altitude;
- the peripheral zones diverge horizontally 7 to the local stability and instability limit of the atmosphere.

The stability of the atmosphere is notably related to the derivative of the potential temperature $\theta$ with respect to altitude Z, $$\frac{\partial \theta}{\partial Z}.$$

By definition the potential temperature $\theta$ is the temperature reached by a volume of fluid, taken at the altitude Z at a temperature T(Z) and at a pressure P(Z) and brought adiabatically in the vicinity of the ground to a pressure taken arbitrarily at 1000 Hpa. In the general case, this temperature depends on the initial mixture of air and water and the atmospheric temperature profile. The adiabatic assumption is justified by the fact that the significant thermal exchanges between elements of the atmosphere take place over a much greater time scale than the scale on which the convection phenomena occur.

When $$\frac{\partial \theta}{\partial Z} > 0,$$

the atmosphere is unstable, the buoyancy of an air bubble is positive and it consequently rises until it encounters a stable zone, the updraft phenomenon mentioned above is then launched, along a vertical axis 24.

When $$\frac{\partial \theta}{\partial Z} < 0,$$

the atmosphere is stable, an air bubble that has deviated from its equilibrium position returns thereto by performing damped oscillations which are gravity oscillations. The angular frequency $\Omega$ of the oscillations, termed "Brunt-Väisälä angular frequencies", is given by the following relation:

$$\Omega^2 = -\frac{g}{\theta}\frac{\partial \theta}{\partial Z} \qquad (1)$$

g being the acceleration due to gravity.

In the general case, this angular frequency cannot be determined in a reliable manner with the aid of the sensors present on board an aircraft for example. In the case of dry air, that is to say beyond the stratification zone 10 of the convective system, the angular frequency $\Omega$ is given by the following relation:

$$\Omega^2 = -\frac{\gamma-1}{\gamma}\frac{g}{P}\frac{dP}{dZ} + \frac{g}{T}\frac{dT}{dZ} \qquad (2)$$

The constant $\gamma$ is equal to 1.4. The quantities P and T are the aforesaid quantities P(Z) and T(Z).

The derivative of the pressure P with altitude Z is known a priori. The same holds for the derivative of the temperature T when located above the instability zone and in particular in the tropopause 9 where it is zero. Under these conditions, a priori knowledge of the angular frequency is possible. The angular frequency $\Omega$ is illustrated in FIG. 1 by the phenomenon of gravity oscillations 8 in a stable atmosphere. These oscillations 8 follow on from the rebounds of the air streams 6 on the tropopause. More particularly, the oscillations follow on from the penetration into a stable atmosphere layer of an ascending current originating from the unstable lower regions.

Figure 2:
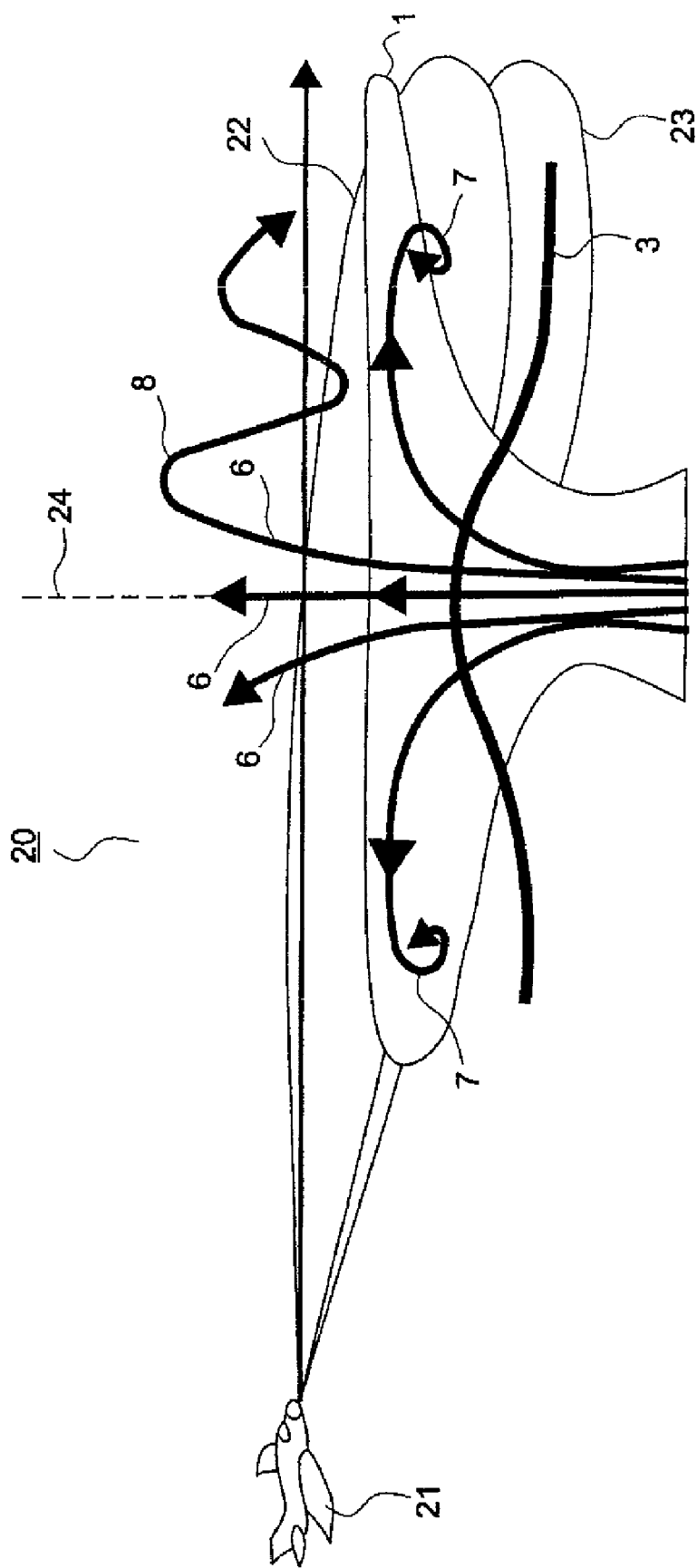
FIG. 2, an aircraft equipped with an electromagnetic sensor heading towards a convective system of the type of that of FIG. 1.

FIG. 2 illustrates an aircraft 21 heading towards a convective system 1 of the type of that of FIG. 1. The aircraft is equipped with a radar, for example situated at the front. This aircraft is for example an airliner. Advantageously, the method according to the invention uses a principle of indirect measurement of atmospheric turbulence relying on the observation of meteorological phenomena which are not situated in the zone 20 where one seeks to estimate the turbulence, the relationship between the observable phenomena and the reckoning of turbulence relying notably on the application of fluid mechanics principles.

Thus, in the example of FIG. 2, the aeroplane 21 flies at an altitude lying above the convective system 1. The onboard radar then initially performs a search, with negative elevation, for the upper zone of this convective system that might be reflecting. In FIG. 2, two positions 22, 23 of the radar beam are illustrated. The search can be performed either by horizontal scanning of the beam at different elevations, or vertically or else by any other type of scanning allowing azimuthal and elevational utilization of space. Subsequently, the radar performs a search for the divergence signature 7. For this purpose, the radar makes measurements of radial speed through its Doppler function. It in fact measures the radial speed of the echoes that it detects on the upper zone of the system 1. Given that the observation elevation is around 0°, in fact slightly negative, it is possible that the radial speed and the horizontal speed may coincide and be confused.

Figure 3:
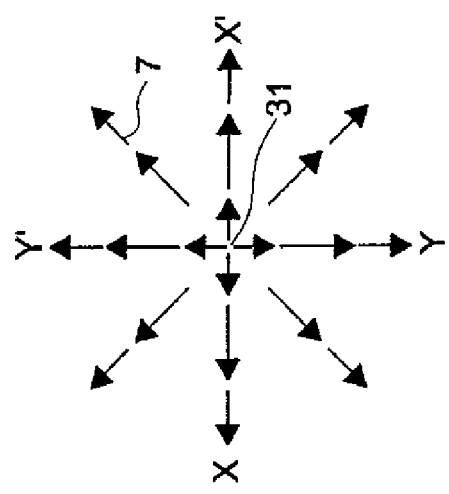
FIG. 3, an illustration of the horizontal divergence inside a convective system.

FIG. 3 illustrates a horizontal divergence in a view from above from a vertical axis 31. The echoes, notably the tracers, of the convective system 1 diverge from this axis 31. FIG. 3 illustrates the divergence lines 7 in a horizontal plane defined by axes X'X and Y'Y.

The "Doppler" signature of a pure horizontal divergence phenomenon, without rotational motion, about the vertical axis 31 results in a Doppler speed profile that is nearly linear when the radar sighting axis cuts the vertical central axis 24 of the updraft, the latter then coinciding with the vertical axis 31.

Figure 4B:
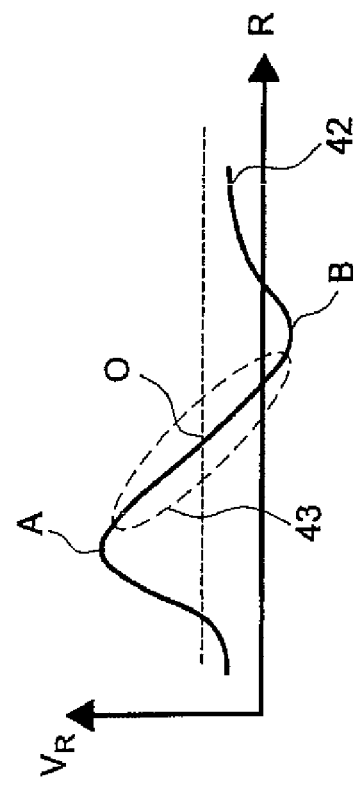
FIGS. 4a and 4b, respectively an illustration of a zone of radar measurements and of a turbulence profile.
Figure 4A:
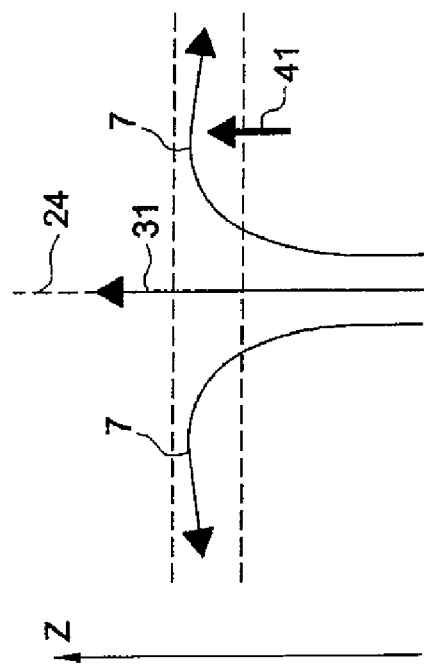

FIG. 4a illustrates the zone 41 of radar measurements by a sectional view along the altitude Z. The divergence lines 7, lying in the measurement zone, are therefore represented here altitude-wise. The determination of the centre 31 of the divergence is for example carried out by analysing the Doppler measurement profiles with respect to the distance measurements for various sighting azimuths, i.e. by analysing the quantity $$\frac{\partial V_R}{\partial R}$$

where $V_R$ represents the radial speed and R the radial distance with respect to the radar. The radial speed and the radial distance are the speed and the distance measured in the radar sighting axis.

FIG. 4b illustrates this profile. As indicated previously the radial speed $V_R$ corresponds substantially to the horizontal speed and the radial distance R to the horizontal distance. The profile is illustrated by a curve 42 in a system of axes where the ordinates represent $V_R$ and the abscissae R. The profile of larger negative gradient corresponds to a sighting, therefore a radar beam, that cuts the centre of the divergence. On the curve 42, the gradient $$\frac{\partial V_R}{\partial R}$$

is negative on a portion 43 which defines the divergence. The divergence zone adopted may be that whose Doppler speed profile as a function of distance exhibits the largest gradient $$\frac{\partial V_R}{\partial R}.$$

More particularly, the radial speed $V_R$ being taken as positive when it is oriented towards the radar, the sign of $$\frac{\partial V_R}{\partial R}$$

indicates the existence of a divergence or a convergence. In the event of convergence, the sign is positive. Subsequently, the term divergence will be used in relation to the quantity $$\frac{\partial V_R}{\partial R},$$

a positive sign of the latter implying convergence. It is therefore possible to chart the centre of a divergence or convergence by the profile exhibiting the largest absolute value $$\left|\frac{\partial V_R}{\partial R}\right|.$$

Subsequently, it is possible to fix two thresholds, a first negative threshold on $$\frac{\partial V_R}{\partial R}$$

for the divergence zones and a second positive threshold on the convergence zones.

The portion 43 lies between a point A and a point B, with a centre O, it forms the signature of the divergence. These points A, B and O are additionally charted in the convective system illustrated by FIG. 5.

Errors may possibly be introduced into the determination of the quantity $$\frac{\partial V_R}{\partial R}.$$

A first type of error may be introduced through the angular aperture of the antenna lobe of the radar. The radar beam not being infinitely fine, the observed profile is in reality the mean, weighted by the local reflectivity, of the Doppler speed field $V_R$ in a Distance-Angle radar resolution cell. The amplitude of the variation of the Doppler speed and the speed gradient as a function of distance are then reduced. By making the assumption of uniform local reflectivity, knowing a priori the dimensions of the resolution cell, it is however possible to reconstruct the speed profile such as it would be observed with a radar having infinite resolution.

A second type of error may be introduced through a rotational motion of the divergence. Indeed, in certain cases a spurious rotational motion is superimposed on the horizontal divergence 7. The estimation of the rotational spurious motion in the divergence can be performed by analysing the variation of the Doppler speed in the distance bin corresponding to the centre of the divergence, as a function of the sighting azimuth. If no variation is observed, the rotation motion is zero. In the converse case the rotational component is deduced from this variation.

FIG. 5 shows indeed that the points A and B delimit a zone where $$\frac{\partial V_R}{\partial R}$$

is negative, corresponding to an updraft zone, the point O being the middle of this zone.

To define $$\frac{\partial V_Z}{\partial Z}$$

which characterizes a measure of vertical wind gusts, the invention advantageously uses the mass conservation equation also called the continuity equation, thereby signifying that in a steady state, independently of time, the divergence of the momentum $\rho.\vec{V}$ is zero, this being expressed by the following relation:

$$div(\rho.\vec{V}) = 0 \qquad (3)$$

Considering the density $\rho$ to be constant, relation (3) amounts to saying that the divergence of the speed vector is zero, i.e.:

$$\frac{\partial Vx}{\partial X} + \frac{\partial Vy}{\partial Y} + \frac{\partial Vz}{\partial Z} = 0 \qquad (4)$$

Vx and Vy representing the components of the speed vector in the horizontal plane X, Y of FIG. 3, Vz its component along the altitude axis Z, i.e. $\vec{V} = (Vx, Vy, Vz)$.

By assuming that the divergence is invariant under circular revolution about the divergence axis 31, it follows that $$\frac{\partial Vx}{\partial X} = \frac{\partial Vy}{\partial Y}.$$

Additionally, the horizontal components $$\frac{\partial Vx}{\partial X}$$

and $$\frac{\partial Vy}{\partial Y}$$

are substantially equal to $$-\frac{\partial V_R}{\partial R}.$$

From relation (4), it is deduced that:

$$\frac{\partial Vz}{\partial Z} \text{ is substantially equal to } 2\frac{\partial V_R}{\partial R} \qquad (5)$$

The measurement accessible to the radar or the electromagnetic sensor is $$\frac{\partial V_R}{\partial R}.$$

Indirectly, this measurement makes it possible to access the quantity $$\frac{\partial Vz}{\partial Z}$$

which gives information on the existence of vertical wind gusts that may arise above the convective system, and that might create turbulence. It is possible to determine a threshold St such that $$\left|\frac{\partial V_R}{\partial R}\right| > St$$

corresponds to detection of turbulence.

The mode of detection previously described relies on conservation of mass. It is possible to use other fluid mechanics properties, in particular conservation of total energy, the sum of the potential energy and of the kinetic energy according to Bernouilli's equation.

Thus, by considering a unit mass element and assuming it to be isolated from the remainder of the atmosphere, by a virtual contour isolating it mechanically and thermally, and initially neglecting viscosity effects and assuming its density to be nearly constant, conservation of energy can be conveyed by the following relation:

$$\frac{|\vec{V}|}{2} + E_p = Cte \qquad (6)$$

$\vec{V}$ is the speed vector tied to this isolated element of atmosphere, $E_p$ is its potential energy of flotation in the environment, Cte being a constant value.

By considering:
- a first equipotential surface in the tower 4 of the cumulonimbus, surface assumed to be horizontal;
- that all the fluid particles crossing the intersection of the tower with this first equipotential surface are homokinetic;
- a second equipotential surface 51 in the vicinity of the divergence of the ascending stream and of the zone 41 in which the Doppler measurements are carried out;

it is possible to assume that all the fluid particles arising from the updraft have the same modulus of the speed vector on this second equipotential surface.

In particular, to within viscosity effects, the modulus of the speed vector of the fluid measured at the points A, B and O of FIGS. 2 and 4b is the same. These points exhibit notably the following properties;
- the speed vector at the points A and B is in the horizontal plane;
- the speed vector at the point O is vertical.

In practice, it is possible to take account of the existence of a mean wind that is eliminated by reasoning with regard to the algebraic difference of the radial speed at the points A and B. It is also possible to take account ou the viscous effects. The vertical speed Vz(O) at the point O as a function of the radial or horizontal speeds at the points A and B is then given by the following relation:

$$Vz(O) = f\left(\frac{V_R(A) - V_R(B)}{2}\right) \quad (7)$$

The function f is an increasing function. It is for example determined experimentally or with the aid of numerical modelling of convective systems. In the absence of viscous effects or other disturbing phenomena the function f is neutral, i.e. f(x)=x. When the speed Vz(O) reaches a given threshold, to be defined for example experimentally, turbulence is for example detected.

The profile of the equipotential surface 51 in the vicinity of the divergence of the ascending stream can also be determined experimentally or with the aid of numerical modelling. It is possible to consider it to be horizontal and flat in a simplifying approach.

Another fluid mechanics property can also be used for another possible mode of detection, employing the calculation of the angular frequency of the adiabatic flotation oscillations 8 termed Brunt-Väisälä angular frequencies.

As regards the flotation oscillations 8 in a stable zone, an element isolated from the remainder of the atmosphere by a virtual contour isolating it mechanically and thermally, is considered as previously. If it has deviated vertically from its flotation equilibrium point at an altitude $Z_{EQ}$ its motion then obeys the following relation, viscous effects being neglected:

$$\frac{\partial^2 Z}{\partial^2 t} + \Omega^2 (Z - Z_{EQ}) = 0 \quad (8)$$

This relation corresponds to a sinusoidal motion of a given amplitude about the altitude $Z_{EQ}$ at the angular frequency $\Omega$ defined by relations (1) or (2).

The invention advantageously uses the particular properties of the oscillating phenomenon. Thus, beyond a certain limit between stability and instability, the motion obeys a damped sinusoidal angular frequency which may be known a priori as indicated subsequently. Utilization of the properties of these oscillations serves to refine the quality of the turbulence detection. Indeed, the fact that the phenomenon is oscillating and sinusoidal is used notably to determine the Z profile of the vertical speed Vz in the given observation zone which is the non-reflecting zone. Stated otherwise, the oscillating properties are utilized in terms of extrapolating what is measured at a spot visible to the radar to what one seeks to ascertain at a given spot which is not, however, necessarily reflecting to the radar.

Figure 6:
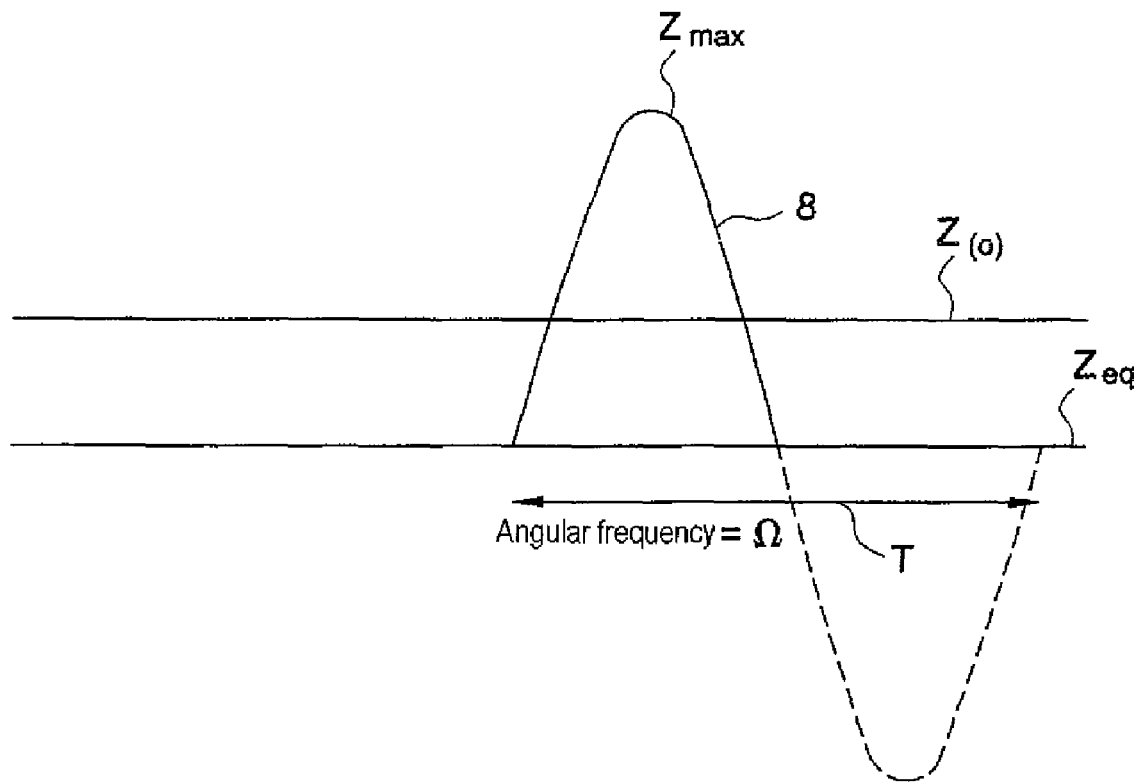
FIG. 6, an illustration of an oscillation motion of an isolated element of the atmosphere.

FIG. 6 illustrates the oscillation motion 8 of an isolated element of the atmosphere. The oscillation is represented over a length corresponding to the angular frequency $\Omega$ with a maximum altitude Zmax, the oscillation being centred on the altitude $Z_{EQ}$. The altitude Z(O) corresponds to the altitude where the Doppler measurement is performed. In relation (8) by eliminating the time, the position at an altitude Z and the speed Vz at this altitude are linked by the following relation:

$$(Z - Z_{EQ})^2 + \frac{Vz^2}{\Omega^2} = A^2 \quad (9)$$

A being a constant parameter.

Figure 7:
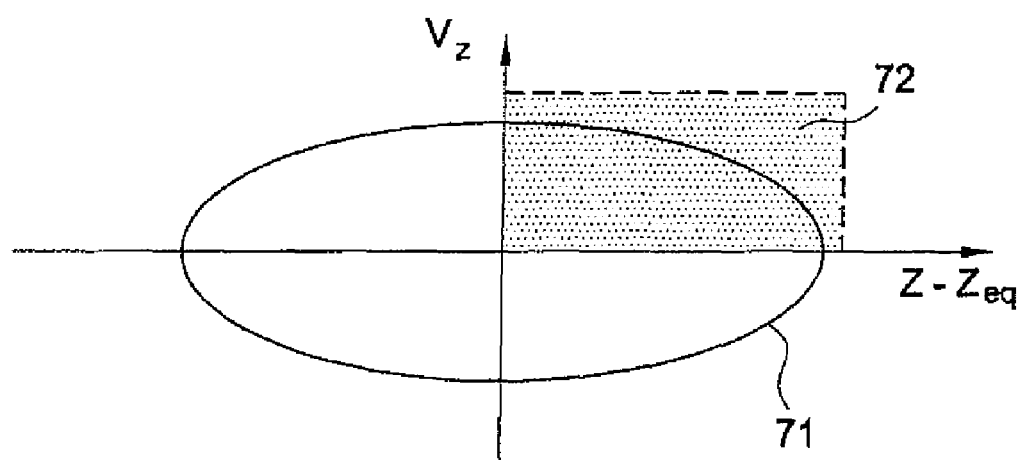
FIG. 7, an ellipse defining altitude-vertical speed pairs.

FIG. 7 illustrates by an ellipse the pairs $(Z - Z_{EQ}, Vz)$ which satisfy this relation (9). These pairs form an ellipse 71 in a system of axes where the abscissae represent $Z - Z_{EQ}$ and the ordinates represent Vz. The only possible solutions are in fact situated in a domain 72 where Vz>0 and dVz/dZ<0 are satisfied, corresponding additionally to the portion 43 of FIG. 4. As a result of the analysis of the previous steps, the profile of a vertical gust, resulting from the updraft created by the convective system in the unstable zone and continuing its ascent in the upper atmospheric zone of stability, is determined by measuring the parameters A and $Z_{EQ}$. It is possible to assume that the angular frequency $\Omega$ is known a priori by considering the standard parameters of the atmosphere at the spot considered such as defined by relation (2).

Differentiation of the speed Vz with respect to Z in relation (9) leads to the following relation:

$$A = (Z - Z_{EQ}) \sqrt{1 + \left(\frac{\Omega}{\frac{\partial Vz}{\partial Z}}\right)^2} \quad (10)$$

For a given radar measurement altitude Z, the continuity relation leading to relations (4) and (5) makes it possible to obtain A in the following form:

$$A + \mu(Z) \cdot Z_{EQ} = \mu(Z) \cdot Z \quad (11)$$

with $$\mu(Z) = \sqrt{1 + \left(\frac{\Omega}{\partial Vz / \partial Z}\right)^2}$$

By making several measurements at N altitudes $Z_i$, where $i \in [0, \ldots, N-1]$, it is possible to obtain N equations according to relation (11).

Direct application of relations (7) and (9) makes it possible to obtain the following energy relation:

$$A^2 - [Z(O) - Z_{EQ}]^2 = \left[\frac{Vz(O)}{\Omega}\right]^2 \quad (12)$$

and $$Z_{EQ} < Z(O)$$

As previously, by making several measurements at N altitudes, it is possible to obtain N equations according to relation (12) below.

In the general case, there are two unknowns: A and $Z_{EQ}$. By using the previous two criteria, defined by relations (11) and (12), it is possible to determine A and $Z_{EQ}$. Other possibilities can be envisaged, in particular:
- the altitude $Z_{EQ}$ can be postulated a priori, in this case the system to be solved now has only one unknown A;
- the measurements inevitably being accompanied by errors, it is beneficial to use a plurality of radar measurements at various altitudes, while however remaining in the divergence zone of the convective system.

In all cases, statistical numerical procedures known to the person skilled in the art are or may be called upon when solving the system of unknowns A and $Z_{EQ}$. In this case, various weightings can be introduced onto each measurement or onto each of the two criteria (11), (12). Likewise, a certain number of steps of likelihood functions may be introduced at various stages when solving the system.

It will readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method for detecting atmospheric turbulence in a given zone by an electromagnetic sensor, comprising the steps of:
    searching for an upper part of a convective system, reflecting the electromagnetic waves;
    searching for a divergence zone inside the convective system by searching for a divergence profile; and
    reckoning appearance of turbulence in the given zone as a function of observable meteorological phenomena in the divergence zone by applying fluid mechanics properties by a computer system on board an aircraft wherein that turbulence is reckoned to be detected when the quantity $$\left|\frac{V_R(A) - V_R(B)}{2}\right|$$

is greater than a given threshold, $V_R(A)$ and $V_R(B)$ being the radial speeds at points A and B situated at two substantially opposite ends of the divergence zone.

2. The method according to claim 1, wherein the convective system is situated outside the given zone.

3. The method according to claim 1, wherein the sensor performs a detection with negative elevation of close to 0°.

4. The method according to claim 1, wherein the profile of the divergence is given by the quantity $$\frac{\partial V_R}{\partial R}$$

where $V_R$ represents the radial speed and R the radial distance with respect to the sensor of an element of the divergence zone, the quantity $$\frac{\partial V_R}{\partial R}$$

being negative on a given radial distance portion indicating the possible existence of a divergence zone.

5. The method according to claim 4, wherein a divergence zone is detected when the absolute value of the quantity $$\frac{\partial V_R}{\partial R}$$

is greater than a given threshold.

6. The method according to claim 1, wherein turbulence is reckoned to be detected when the absolute value of the quantity $$\frac{\partial V_R}{\partial R}$$

exceeds a given threshold St.

7. The method according to claim 1, wherein an isolated element of the divergence zone having an oscillation motion obeying a damped sinusoidal angular frequency know a priori, the reckoning of appearance of the turbulence utilizes the properties of these oscillations, the oscillating properties being utilized to extrapolate what is measured at a spot visible to the radar to the given zone.

8. The method according to claim 1, wherein the sensor is embedded aboard an aircraft.

9. The method according to claim 1, wherein that measurements of radial speed use the Doppler effect.

10. The method according to claim 1, wherein the sensor measures the rotational motion of the divergence so as to compensate for the measurement errors induced by this motion in the determination of the profile.

11. The method according to claim 2, wherein the sensor performs a detection with negative elevation of close to 0°.

12. The method according to claim 2, wherein the profile of the divergence is given by the quantity $$\frac{\partial V_R}{\partial R}$$

where $V_R$ represents the radial speed and R the radial distance with respect to the sensor of an element of the divergence zone, the quantity $$\frac{\partial V_R}{\partial R}$$

being negative on a given radial distance portion indicating the possible existence of a divergence zone.

13. The method according to claim 3, wherein the profile of the divergence is given by the quantity $$\frac{\partial V_R}{\partial R}$$

where $V_R$ represents the radial speed and R the radial distance with respect to the sensor of an element of the divergence zone, the quantity $$\frac{\partial V_R}{\partial R}$$

being negative on a given radial distance portion indicating the possible existence of a divergence zone.

14. The method according to claim 2, wherein turbulence is reckoned to be detected when the absolute value of the quantity $$\frac{\partial V_R}{\partial R}$$

exceeds a given threshold St.

15. The method according to claim 3, wherein turbulence is reckoned to be detected when the absolute value of the quantity $$\frac{\partial V_R}{\partial R}$$

exceeds a given threshold St.

16. The method according to claim 2, wherein an isolated element of the divergence zone having an oscillation motion obeying a damped sinusoidal angular frequency know a priori, the reckoning of appearance of the turbulence utilizes the properties of these oscillations, the oscillating properties being utilized to extrapolate what is measured at a spot visible to the radar to the given zone.

17. The method according to claim 4, wherein an isolated element of the divergence zone having an oscillation motion obeying a damped sinusoidal angular frequency know a priori, the reckoning of appearance of the turbulence utilizes the properties of these oscillations, the oscillating properties being utilized to extrapolate what is measured at a spot visible to the radar to the given zone.

* * * * *